United States Patent
Livshin et al.

(10) Patent No.: US 8,775,918 B2
(45) Date of Patent: Jul. 8, 2014

(54) SYSTEM AND METHOD FOR AUTOMATIC IMPROVEMENT OF ELECTRONIC PRESENTATIONS

(75) Inventors: Arie Livshin, Jerusalem (IL); Motti Nisani, Sede-Hemed (IL); Shai Schwartz, Tel-Aviv (IL)

(73) Assignee: Visual Software Systems Ltd., Sede-Hemed (IL)

( * ) Notice: Subject to any disclaimer, the term of this patent is extended or adjusted under 35 U.S.C. 154(b) by 686 days.

(21) Appl. No.: 12/566,067

(22) Filed: Sep. 24, 2009

(65) Prior Publication Data

US 2010/0088605 A1   Apr. 8, 2010

Related U.S. Application Data

(60) Provisional application No. 61/103,253, filed on Oct. 7, 2008.

(51) Int. Cl.
G06F 3/01 (2006.01)
G06F 17/21 (2006.01)

(52) U.S. Cl.
CPC .................. *G06F 17/211* (2013.01); *G06F 17/212* (2013.01)
USPC ........................................ 715/202

(58) Field of Classification Search
CPC .............. G06F 17/211; G06F 17/212
USPC .................................. 715/202, 731
See application file for complete search history.

(56) References Cited

U.S. PATENT DOCUMENTS

| | | | |
|---|---|---|---|
| 6,865,714 B1* | 3/2005 | Liu et al. | 715/235 |
| 7,028,325 B1* | 4/2006 | Rui et al. | 725/37 |
| 7,031,495 B2* | 4/2006 | Takahashi et al. | 382/100 |
| 7,383,509 B2* | 6/2008 | Foote et al. | 715/731 |
| 7,607,089 B2* | 10/2009 | Baker et al. | 715/730 |
| 7,739,601 B1* | 6/2010 | Wong et al. | 715/731 |
| 7,836,110 B1* | 11/2010 | Schoenbach et al. | 707/829 |
| 7,975,227 B2* | 7/2011 | Covannon et al. | 715/731 |
| 2005/0091599 A1* | 4/2005 | Yamakado et al. | 715/732 |
| 2006/0064631 A1* | 3/2006 | Parker | 715/500 |
| 2006/0253777 A1* | 11/2006 | Yalovsky | 715/530 |
| 2006/0288278 A1* | 12/2006 | Kobayashi | 715/523 |
| 2007/0055939 A1* | 3/2007 | Furlong et al. | 715/731 |
| 2007/0162857 A1* | 7/2007 | Weber et al. | 715/731 |
| 2007/0186167 A1* | 8/2007 | Anderson | 715/730 |
| 2007/0256017 A1* | 11/2007 | Nishimura et al. | 715/730 |
| 2007/0300158 A1* | 12/2007 | Kasperkiewicz et al. | 715/731 |
| 2008/0040340 A1* | 2/2008 | Varadarajan et al. | 707/5 |
| 2008/0178089 A1* | 7/2008 | Baker et al. | 715/732 |
| 2008/0189591 A1* | 8/2008 | Lection | 715/202 |
| 2008/0201635 A1* | 8/2008 | Yamakado et al. | 715/256 |
| 2009/0319555 A1* | 12/2009 | Ragno et al. | 707/102 |
| 2009/0327896 A1* | 12/2009 | Pall et al. | 715/730 |

(Continued)

*Primary Examiner* — William Bashore
*Assistant Examiner* — Nathan Shrewsbury
(74) *Attorney, Agent, or Firm* — Pearl Cohen Zedek Latzer Baratz LLP

(57) ABSTRACT

A system and method for improving electronic presentations is provided. The system may automatically improve an electronic presentation. An input presentation may be analyzed and various parameters may be computed. Based on text and/or other analysis, images and/or other objects may be selected to be included in a generated electronic presentation. A design scheme may be automatically selected. An improved electronic presentation may be automatically generated based on an original presentation, user selected parameters, text and/or other analysis of the original presentation and a set of rules, criteria and parameters.

30 Claims, 7 Drawing Sheets

(56) References Cited

U.S. PATENT DOCUMENTS

2010/0031152 A1* 2/2010 Villaron et al. ............... 715/731
2010/0070497 A1* 3/2010 Duplessis et al. ............. 707/736
2012/0047432 A1* 2/2012 Yalovsky ...................... 715/244

* cited by examiner

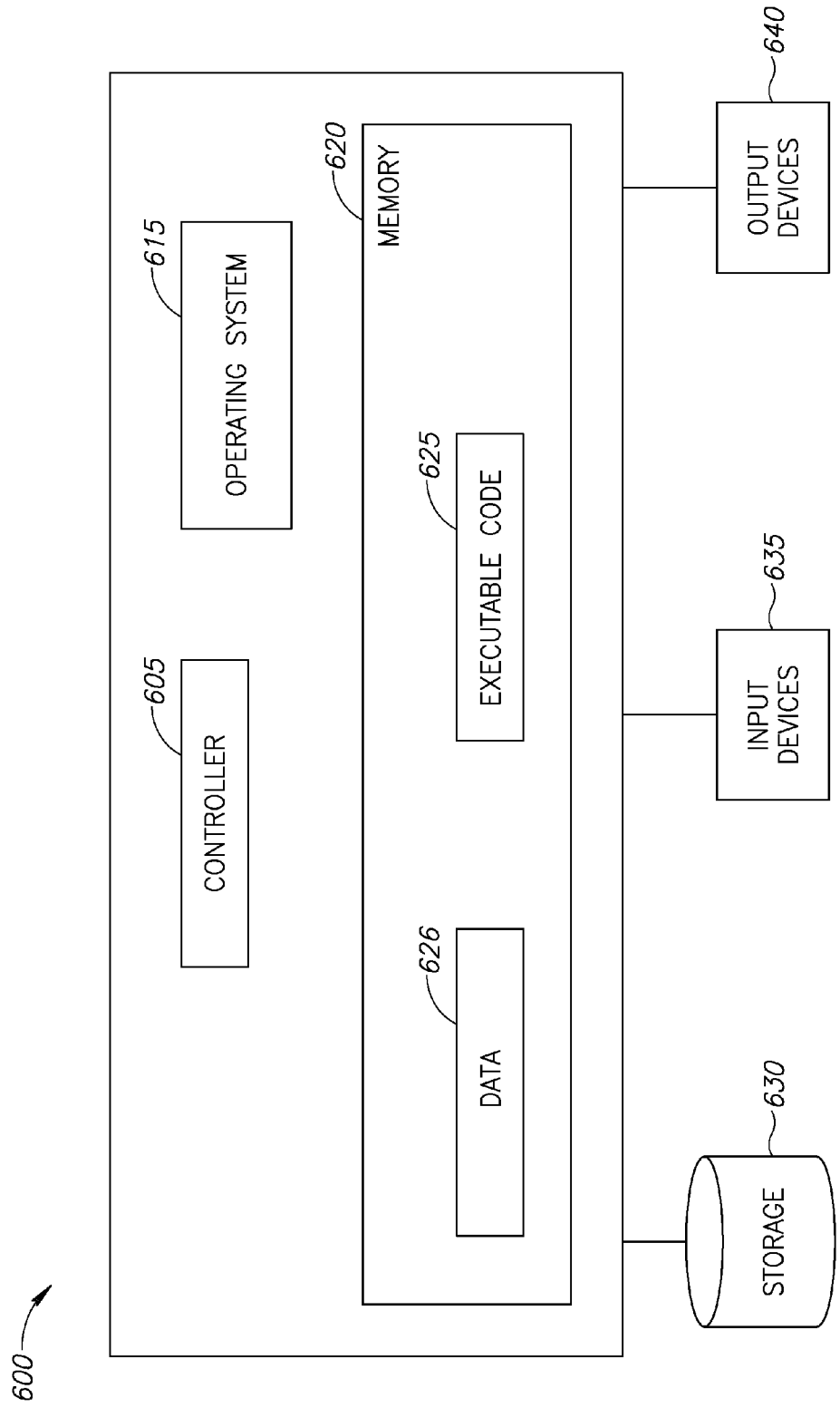

SYSTEM AND METHOD FOR AUTOMATIC IMPROVEMENT OF ELECTRONIC PRESENTATIONS

CROSS-REFERENCE TO RELATED APPLICATIONS

This application claims the benefit of U.S. Provisional Patent Application No. 61/103,253, filed on Oct. 7, 2008, which is incorporated in its entirety herein by reference.

BACKGROUND OF THE INVENTION

Electronic presentations, also known as "slide shows", such as created and viewed with Microsoft®'s Powerpoint®, are extensively used in various domains. Electronic presentations may be used by corporates, as a marketing tool, education institutions as a tutorial tool etc. An environment related to electronic presentations may include tools or applications for an editor to compile, save and/or distribute an electronic presentation and tools or applications that may be used to view or play the electronic presentation.

Electronic presentations enable adding effects and aspects to information being conveyed in various ways, accordingly, many choices are available to an editor of an electronic presentation. For example, colors, images and arrangement of text may all be chosen. An effective electronic presentation is typically one that comprises aesthetically appealing and effective visual aspects as well as effective arrangement of text.

However, the task of producing an effective, aesthetically appealing, well organized or otherwise desirable electronic presentation may be costly and/or time consuming While some time may be spent on the actual information being presented in an electronic presentation, considerable time and other resources are typically required in order to address aspects such as formatting and arrangement of text, selection of images, selection of colors and determining a layout of a slide.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which:

FIG. 6 is a computing device according to embodiments of the invention.

Figure 1A:
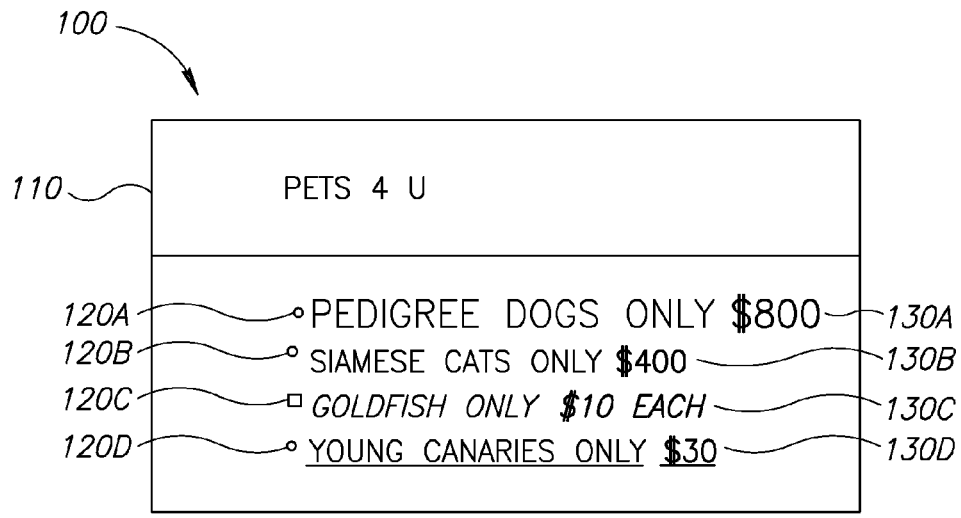
FIG. 1A shows an exemplary slide before an automatic improvement according to embodiments of the invention.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time.

Embodiments of the invention may be implemented in various ways, systems, scenarios and configurations. An exemplary embodiment may comprise a software module installed on a client's computing device. Such module may be integrated or associated with an electronic presentations authoring application or program, e.g., Powerpoint®. Exemplary functionalities, logical and/or functional blocks and/or other aspects of such module and other components of systems according to embodiments of the invention are further described herein.

Embodiments of the invention may include one or more servers that may communicate, e.g., over the internet or other computer network, with the client's computing device. Typically, when a user operating the client computing device wishes to improve an electronic presentation the user may activate the software module, providing the module with a reference to a presentation that is to be improved. The software module may communicate with the one or more servers in order to perform the task of improving the presentation as described herein. For example, images, schemes, or other data and/or parameters may be downloaded from a server and used in the generation of an improved presentation or a modification of an input presentation. The software module may be integrated, e.g., as a plugin or addon into a presentation authoring application thus enabling a user to conveniently activate the module from within the presentation authoring application. For example in some embodiments, a button may be added to the graphical user interface (GUI) of an application and accordingly, presentation improvement may be activated by pressing such button.

In other embodiments of the invention, functionalities related to the module discussed herein may be performed by a remote server, e.g., a website. For example, a user may upload a presentation to a website or remote server, optionally provide the server with guidelines, parameters and/or other information and the remote server may perform the improvement of the presentation. The user may be notified upon completion of a generation of an improved presentation or a modification of an input presentation and may download or otherwise retrieve the improved presentation to his computing device Improvement of a presentation may comprise or be performed by modifying an original presentation or it may be accomplished by generating a new presentation, possibly leaving the original presentation untouched or unmodified. In some embodiments, an original or input presentation may be analyzed as described herein, and based on such analysis, the original or input presentation may be modified to produce an improved presentation. For example, objects in an input presentation may be rearranged, reformatted or otherwise manipulated. Analysis of a presentation, selection of images, layout, scheme and any other methods, logic or procedures described herein may be applicable to a generation of an improved presentation or a modification of an input presentation.

Figure 1B:
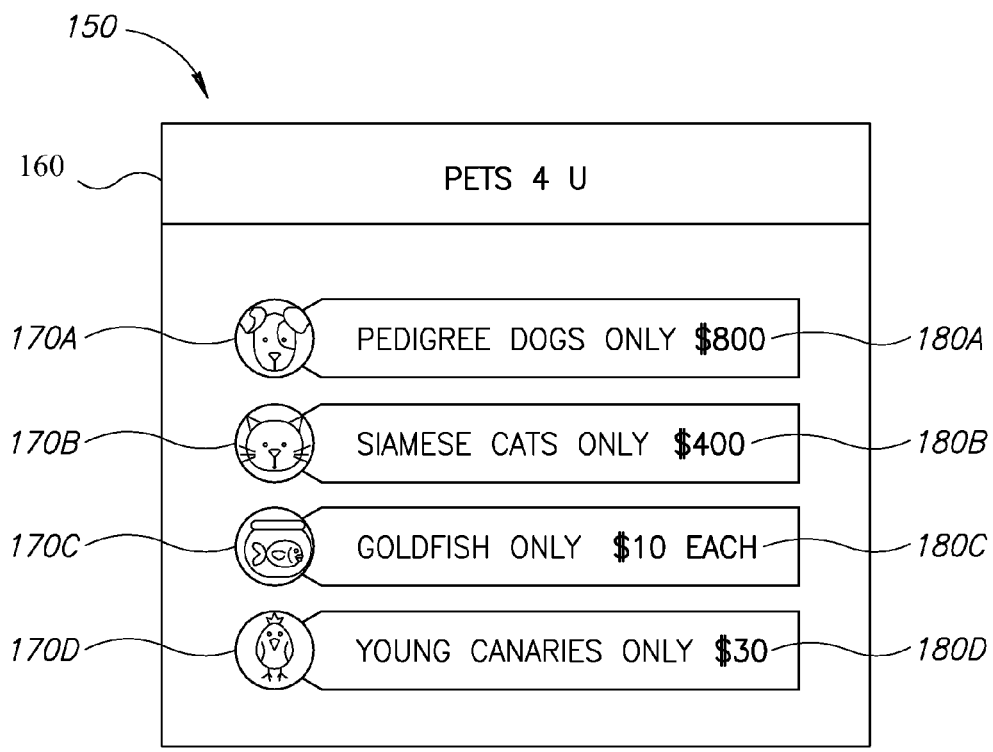
FIG. 1B shows an exemplary slide after an automatic improvement according to embodiments of the invention.

Reference is made to FIGS. 1A and 1B. FIG. 1A shows an exemplary slide 100 of a presentation before an automatic improvement and FIG. 1B shows an exemplary slide 150 of the slide after an automatic improvement was performed. As shown in FIG. 1A, slide 100 may include a header or subject text 110, bullets 120A-D and text lines 130A-D. As shown, bullets 120A-D may be formatted in different shapes, e.g., bullet 120A may be different from bullet 120C in shape, style or other aspects. Lines 130A-D may differ, for example in text size, font etc. As shown by slide 150 in FIG. 1B slide 100 may be modified or a new slide may be generated. As shown, after an automatic improvement was performed, bullets 120A-D may be replaced by images 170A-D. As shown, images 170A-D may be selected to match their respective text, e.g., image 170C showing a fish is related to the "Gold Fish only $10 each" text. Such selection of an image may be based on text analysis of the relevant text as well as other considerations as described below.

As shown by 160, header, title or subject 110 may be formatted, relocated or otherwise manipulated, for example, placed at the center of slide 150 with modified fonts. Lines 130A-D may be replaced by lines 180A-D. For example and as shown, fonts may be changed so they are consistent for all lines 180A-D, a background may be added and colors may be changed. Accordingly, an improved slide 150 may be generated based on an original slide 110, user input, logic and a set of configuration parameters, rules, criteria and other information as described herein.

Figure 2A:
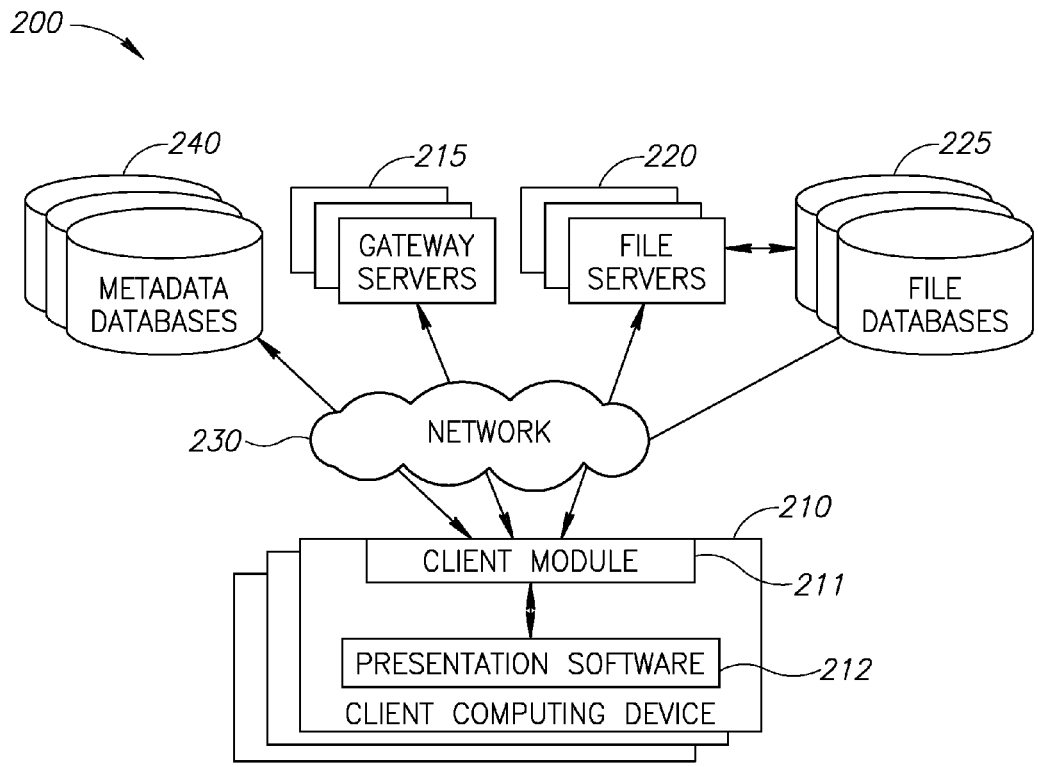
FIG. 2A is a schematic block diagram of a system according to embodiments of the invention.

Reference is made to FIG. 2A that shows an exemplary system 200 according to embodiments of the invention. System 200 may include a one or more client computing devices 210, a one or more gateway servers 215, a one or more file databases 225, a one or more metadata databases 240, a one or more file servers 220 and a network 230. As shown, some or all client computing devices 210 may include a client module 211 and a presentation software 212. For the sake of simplicity and clarity, the discussion herein will refer to a single client computing device 210, a single gateway server 215, a single file database 225, a single metadata database 240 and a single file server 220. It will however be recognized that embodiments of the invention are not limited by the number as well as other aspects of these components.

Network 230 may be, may comprise or may be part of a private IP network, the internet, a number of frame relay connections, a public or private data network, a local area network (LAN), a metropolitan area network (MAN), a wide area network (WAN), a wireless network, an enterprise intranet, any combination of the preceding and/or any other suitable communication means. It will be recognized that embodiments of the invention are not limited by the type, nature or physical aspects of network 230, client computing devices 210, gateway servers 215, file databases 225, metadata databases 240 and file servers 220. Network 230 may enable client computing devices 210, gateway servers 215, file databases 225, metadata databases 240 and file servers 220 to interact and/or communicate and may further enable these computing devices to interact or communicate with other devices or systems not shown in FIG. 2A.

Client computing device 210, gateway server 215, file database 225, metadata database 240 and file server 220 may be or may comprise any applicable device, e.g., a personal computer, a desktop computer, a mobile computer, a laptop computer, a notebook computer, a terminal, a workstation, a server computer, a personal digital assistant (PDA) device, a tablet computer or any other suitable computing device.

Client computing device 210 may be used by a user to view and/or manipulate electronic presentations using presentation software 212. For example, presentation software 212 may be a Powerpoint® application or any suitable electronic presentation authoring application that may be executed on client computing device 210 by a user. Client module 211 may be or may comprise hardware, software, firmware or a combination thereof. Client module 211 may be integrated or otherwise associated with a presentation software 212 used for electronic presentation authoring. For example, client module 211 may be a plug-in or add-on module installed in an application such as Powerpoint® or otherwise associated with such application. A user operating device 210 may activate an automatic improvement of electronic presentations by activating client module 211 on device 210. For example, a button or other GUI object may be added to a presentation application and may be used to activate client module 211.

In some embodiments, gateway server 215 may assume arbitration and/or load balancing functionalities. For example, client module 211 may be configured to interact with a gateway server, for example, client module 211 may be provided with an internet protocol (IP) address of one of gateways servers 215. Accordingly, when client module 211 needs to interact with a file server and/or a metadata database, client module 211 may first interact with the configured gateway server and may obtain from the gateway server an address, e.g., an IP address or other parameter pointing client module 211 to the selected file server, file database and/or metadata database. Such configuration may enable distributing load and managing other aspects involved with the operation of a plurality of client modules 211, file servers 220, file databases 225 and/or metadata databases 240.

File server 220 may be directly connected to file database 225, e.g., by a dedicated network, a data bus or other means (not shown), or it may be otherwise operatively connected to file database 225, e.g., over network 230.

File database 225 may be used for storing files or other objects that may be required by client module 211 for performing its operation as described herein. Such files or objects may include, for example, slide layout files, image files, design scheme files. Other objects may be update files that may be used for updating client module 211, e.g., in order to introduce new features. In the process of generating an improved presentation, client module 211 may require images, layout information, scheme information or other parameters of information. Client module 211 may interact with gateway server 215 which may point client module 211 to a selected file server or database, e.g., file server 220 or file database 225. Gateway 215 may redirect client module 211 to a selected server or database based on various parameters. For example, a server may be selected by gateway 215 based on load distribution logic or based on the specific images, layouts, schemes or other data required by client module 211. Accordingly, gateway 215 may have access to any relevant information, e.g., processing or other load distribution between a plurality of servers and/or databases, the content stored by such databases etc.

File database 225 may be any suitable database device, system, unit or component. For example a commercial and/or off-the-shelf product capable of storing any relevant information or data, e.g., graphic objects, design themes, slide layouts, updated versions of client modules 211 and design rules as described herein.

Metadata databases 240 may store and provide metadata information. For example, metadata related to files or other objects stored in file database 225. For example, metadata may be generated for files stored on file database 225. Such metadata may include parameters such as file name or size. Metadata may be related to images, e.g., color, orientation etc. Such metadata may be used in a selection of an image to be inserted into a presentation. For example, it may be determined that a specific color of or in an image is suitable for a generated presentation, accordingly, only images associated with metadata indicating the desired color may be selected as candidates for insertion into the presentation being generated. It will be recognized that metadata databases 240 and file databases 225 may be any suitable repository, storage device or system.

Metadata may include associated image keywords. As described herein, one or more image keywords may be associated with an image. For example, an image stored on file database 225 may have one or more image keywords associated with it. Such image keywords may be stored on file database 225 and may be associated or linked with the image, e.g., by means of a list listing images and associated image keywords or files containing associated image keywords. As described herein, one or more presentation or slide keywords may be determined, selected, generated or otherwise obtained and associated with a slide or presentation. For example, possibly as a result of analyzing text in slide 100 shown in FIG. 1A, slide keywords "animal" and/or "animals" may be associated with slide 100. Accordingly, when searching for suitable images to be inserted into an improved slide, e.g., slide 150, image keywords in file database 225 may be examined and images associated with image keywords "animal" and/or "animals" may be selected as candidates for insertion into the improved slide or presentation.

Figure 2B:
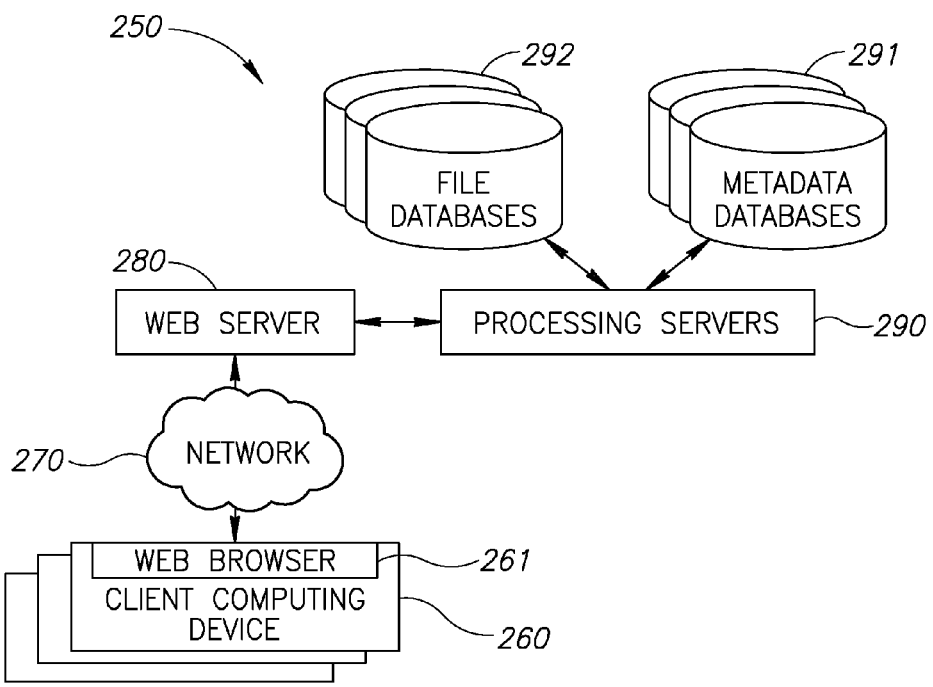
FIG. 2B is a schematic block diagram of a system according to embodiments of the invention.

Reference is made to FIG. 2B that shows another exemplary system 250 according to embodiments of the invention. System 250 may include one or more web servers 280, one or more processing servers 290, a client computing device 260 that may include a web browser 261 or other application or unit enabling a user of computing device 260 to interact with web server 280, one or more metadata databases 291, one or more file databases 292 and a network 270. Network 270 may be similar to network 230 described herein, file database 292 may be similar to file database 225, metadata database 291 may be similar to metadata database 240 and client computing device 260 may be similar to client computing device 210 as described herein.

According to embodiments of the invention, web browser 261 may be used to upload a presentation to web server 280. Such upload may be performed as known in the art, e.g., using any suitable protocol such as file transfer protocol or other protocol. A user may be provided, e.g., by web server 280, with a web page enabling the user to select a presentation to upload and upload of the presentation to web server 280 or to processing server 290. Such web page may include selection menus or other means to enable a user to select various options related to an improvement of a presentation. For example, the web page may enable a user to select a mood for the improved presentation, a preferred layout or any other relevant parameters. Other selections that may be made in such page may be a form of payment for the improvement service, the way the improved presentation will be provided, e.g., by download, email or other methods. A user may further be enabled to specify a repository or location from which images to be inserted into the improved presentation will be selected. For example, a private repository of family pictures may be specified and accordingly, the improved, enhanced or modified presentation may include private family pictures.

A presentation uploaded to web server 280 may be communicated by web server 280 to a selected processing server. Such selection may be similar to a selection made by gateway server 215 as described herein, e.g., based on load distribution logic and parameters or the type and/or nature of the task to be performed. Processing Server 290 may execute a presentation improvement or enhancement software. Such software may use data stored on metadata databases 291 and data residing on file databases 292 in order to create a new presentation according to algorithms and methods described herein. An improved or enhanced presentation generated may be communicated or otherwise provided to a user operating client computing device 260 by processing server 290 or web server 280. Any suitable means or methods for providing or communicating a presentation to be improved to processing server 290 may be used. Likewise, any such methods or means may be used to provide an improved presentation to a user. For example, a presentation may be sent, possibly by a pre-registered user, as an attachment to a predefined electronic mail account and retrieved from such mail account by processing server 290. Similarly, an improved presentation may be communicated as an attachment back to the user. Such arrangement may require a pre-registration by a user and a verification, possibly performed prior to generating an improved presentation, that the relevant user is a pre-registered or paying customer.

Figure 3:
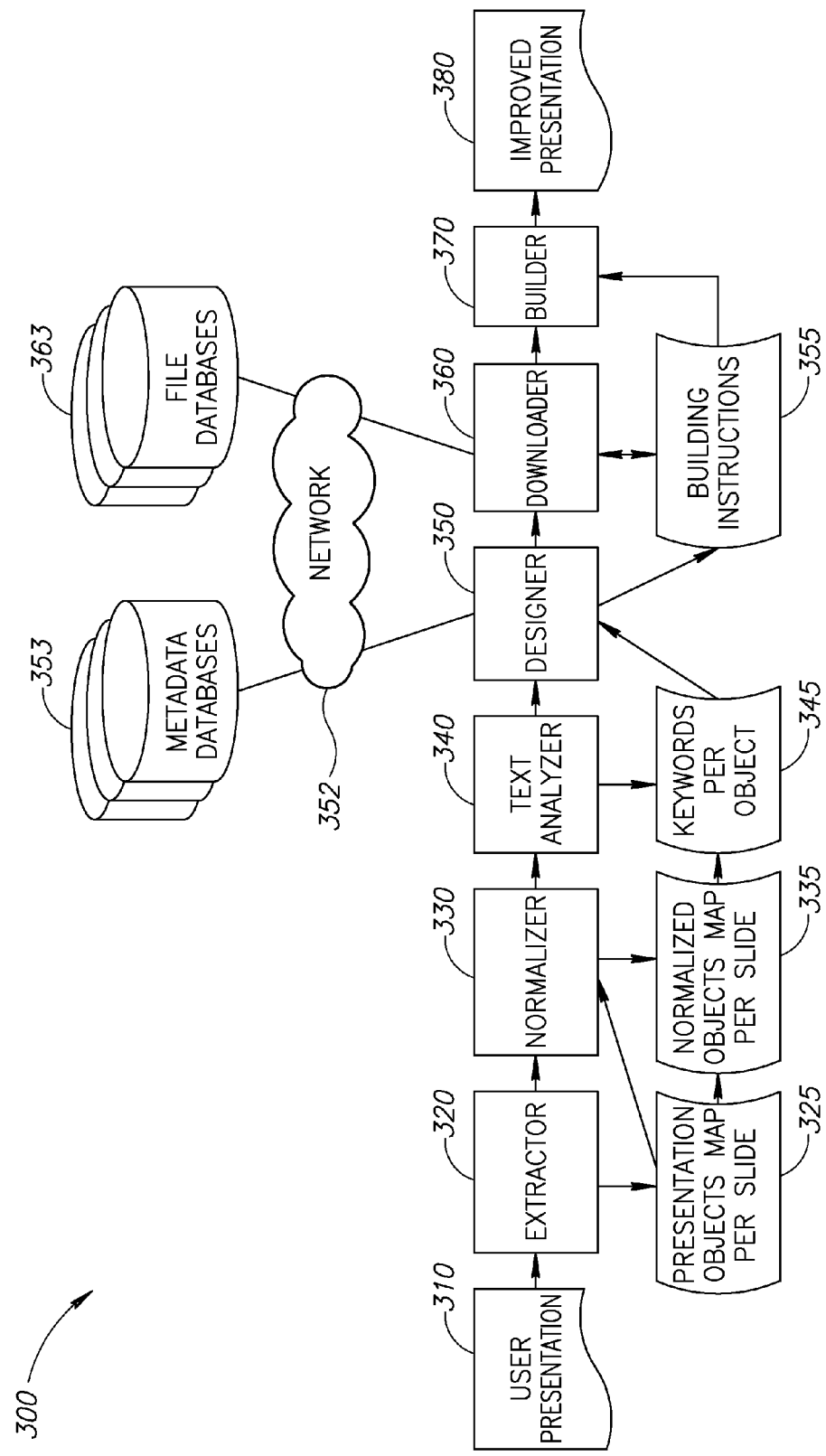
FIG. 3 is a logical block diagram of a system according to embodiments of the invention.

Reference is made to FIG. 3 showing a schematic block diagram of a system 300 according to embodiments of the invention. System 300 may accept user presentation 310 as input and may produce enhanced presentation 380 as output. Enhanced presentation 380 may be an improved presentation that may be based on user presentation 310. Enhanced presentation 380 may be a presentation generated by system 300 or it may be modified user presentation 310. Accordingly, possibly according to a configuration parameter, two presentations may be provided by system 300, namely, the original user presentation 310 and an improved or enhanced presentation 380 or alternatively, system 300 may modify the input presentation and provide an improved or enhanced version that is a modified version of the input presentation. Such options may be selected according to various constraints, e.g., storage capacity available etc. User and enhanced presentations 310 and 380 respectively may be any electronic presentations and may be provided as files, e.g., as known in the art.

System 300 may include an extractor 320, a normalizer 330, a text analyzer 340, a designer 350, a downloader 360, a builder 370, metadata databases 353, file databases 363 and a network 352. Some components of system 300 may produce output or data that may be used by other components of system 300. As shown, extractor 320 may produce presentation objects map 325 that may be related to a slide, e.g., a per slide object map, normalizer 330 may produce a normalized objects map 335 that may be related to a slide, e.g., a per slide normalized object map, text analyzer 340 may produce keywords 345 that may be related to objects identified by extractor 320 and designer 350 may produce building instructions 355 that may be used by builder 370. Building instructions 355 may include any information that may be needed, e.g., by builder 370 in order to generate enhanced presentation 380. For example, images and bullets to be inserted, their respective locations and orientation, layout information, background information etc.

Extractor 320 may extract information from an input presentation. For example, extractor 320 may analyze an input presentation 310, identify objects in such presentation and produce presentation object map 325. Presentation object map 325 may be a per slide map and may list some or all objects identified in the slide or presentation. A presentation object map 325 may list or otherwise contain some or all objects detected in a slide. For example, map 325 may include a list of objects in user presentation 310 without specifying parameters such as their relative location in the slide, their size, the meaning of their text etc. Other than compiling a list of parameters, objects, attributes or other data as described herein, extractor 320 may extract actual data, parameters or other information from a presentation. For example, Powerpoint® parameters of a textbox such as size, location, text paragraphs, colors and/or bullet types may all be extracted by extractor 320. Extractor 320 may provide extracted parameters to any module, unit or entity related to system 300.

Normalizer 330 may receive as input a presentation object map 325 and may normalize it. Normalizing a presentation object map may include preparing it for processing by designer 350 as described herein. For example, an input presentation 310 may include a number of text boxes or objects located in a number of regions on a slide, a title and a number of images. An object map 325 may include all such objects organized in or as a list of objects or items. Normalizer 330 may receive such map or list and arrange it such that related items are grouped together or are otherwise associated. For example, a single object may include all text items, another object or item may include all images etc.

Figure 4A:
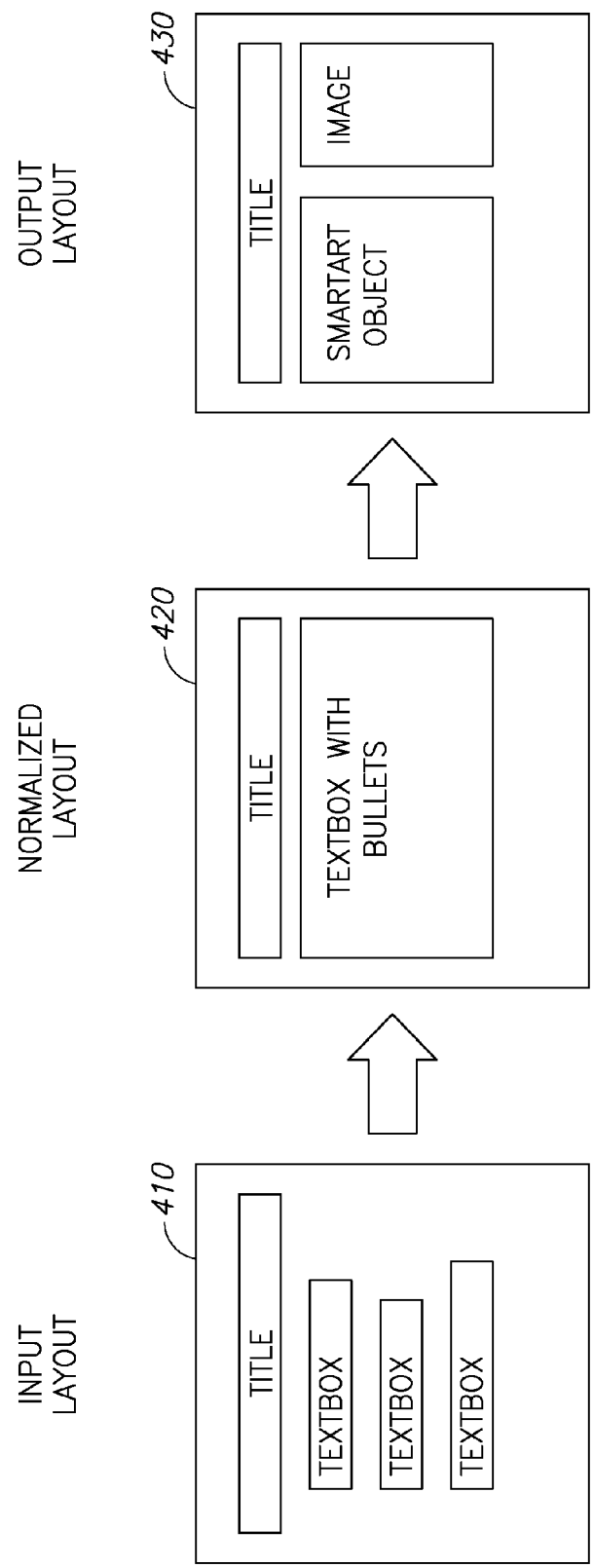
FIGS. 4A and 4B show exemplary slide layouts according to embodiments of the invention.
Figure 4B:
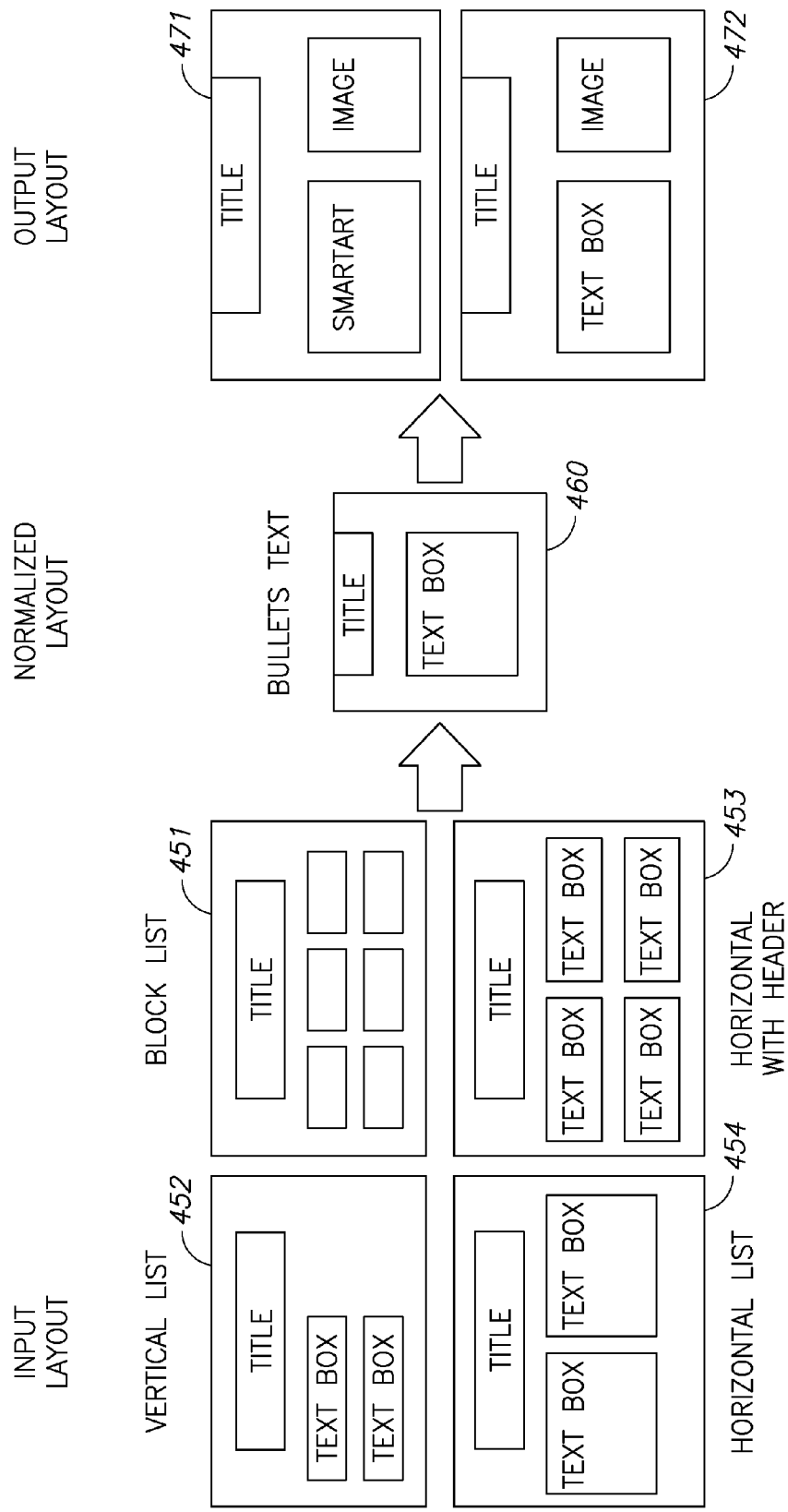

Reference is additionally made to FIGS. 4A and 4B showing exemplary input slide layouts, normalized layouts and output layouts according to embodiments of the invention. As shown by input slide layout 410, an input layout may include a title and a number of text boxes. Extractor 320 may identify the title and text boxes objects, produce, and provide normalizer 330 with a list of identified objects. Normalizer 330 may use such list to produce normalized layout 420 that may include only two items or objects, e.g., a title and a text box, where the single text box in the normalized layout may include the three text boxes in the input layout or information, e.g., the text included in the three text boxes. As further shown, the normalized layout produced by normalizer 330 may be used, e.g., by builder 370, to produce an output layout as described herein.

As shown by FIG. 4B, a number of possible or exemplary input slide layouts 451, 452, 453 and 454 may all be normalized by normalizer 330 to produce a normalized layout 460. For example and as shown, input layouts containing a title and differently arranged text boxes may all be converted by normalizer 330 to the same normalized layout 460 that includes a title and a text box. The text box in the normalized version may include some or all of the text originally included in the separate text boxes of the input presentation. For example and as shown, any number of text boxes may be mapped, grouped or otherwise associated, e.g., by or in a single text box in a normalized layout. A normalized layout and additional information and/or parameters described herein may be used as input to designer 350. Based on the input layout and possibly other parameters, a normalized layout 460 may be used to produce a number of output layouts such as layouts 471 and 472. For example, a normalized layout containing a title and text box as shown by 460 may be used, e.g., by designer 350, to produce an output layout that includes a title, an image and a SmartArt object as shown by output layout 471 or it may be used to produce an output layout that includes a title, an image and a text box object as shown by output layout 472.

According to embodiments of the invention, a normalized layout may include sufficient layout or other information that may be required in order to produce an output layout or slide while simplifying the implementation of designer 350 and/or other stages in the processing of an input presentation, for example, by unifying the input provided to designer 350. As described herein, normalizer 330 may convert complex layouts into simplified layouts also referred to as core or generic layouts and may produce such core, generic or normalized layouts as shown by 335. A set of core layouts that may include a limited number of generic layouts may represent a large number of possible input layouts. Otherwise put, a large number of input or user produced layouts may be mapped into a reduced number of core or generic layouts. Core layouts may be used by designer 350 to produce the output layouts as described herein.

Text analyzer 340 may analyze text according to any algorithm, logic or implementation as described herein. Any text analysis method or means may be used, including commercial, off-the-shelf or other implementations units or modules. It will be recognized that embodiments of the invention are not limited by the type, nature or other aspects of text analyzer 340. Text analyzer 340 may determine parameters such as a subject of a slide, relevant issues and or any parameters or information that may be derived, computed or otherwise obtained by text analysis as known in the art. As described herein, text analyzer 340 may produce a keyword object or list that may be associated with specific objects in a slide or may be associated with the slide as a whole. For example, the subject of the slide may be determined as well as the subject of specific text boxes or objects.

Output produced by a first module, unit or other component of system 300 may be used by a second or other modules, units or components of system 300. For example, presentation objects map 325 produced by extractor 320 may be used by normalizer 330, and normalized objects map 335 produced by normalizer 330 and keywords 345 produced by text analyzer 340 may be used by designer 350. Designer 350 may select images to be inserted into improved presentation 380. For example, based on a list of keywords produced by text analyzer 340, designer 350 may communicate with one of metadata databases 353. Designer 350 may receive from one of metadata databases 353 references that may be used to obtain relevant images from one of file databases 363 as described herein.

Designer 350 may select a scheme for improved presentation 380. According to embodiments of the invention, a design scheme or scheme may define parameters such as fonts attributes, e.g., size, style etc., a color palette, a background, visual effects, e.g., floating text, moving images and sounds and/or other "look and feel" aspects as known in the art. For example, based on a mood selection made by a user. Designer 350 may select a layout for slides in improved presentation 380. Such selection may be based on user input, a selected scheme and a core or normalized layout described herein. Downloader 360 may perform the task of downloading any required data, objects or other items required for a generation of improved presentation 380. For example, based on a selection of images, a list of images to be downloaded may be provided to downloader 360. Using such list, downloader 360 may download images from one of file databases 363. Other objects, data, parameters or information that may be downloaded by downloader 360 may be schemes, layouts or any other parameters or data that may be stored on a remote computing device, database, storage or repository.

Builder 370 may use any information described herein, e.g., a scheme, a layout, images and text to build, generate or produce improved presentation 380. Builder 370 may generate improved presentation 380 by modifying input presentation 310 or by generating a new presentation based on input presentation 310. Builder 370 may generate improved presentation 380 using images, layout and scheme selected and downloaded as described herein.

Figure 5:
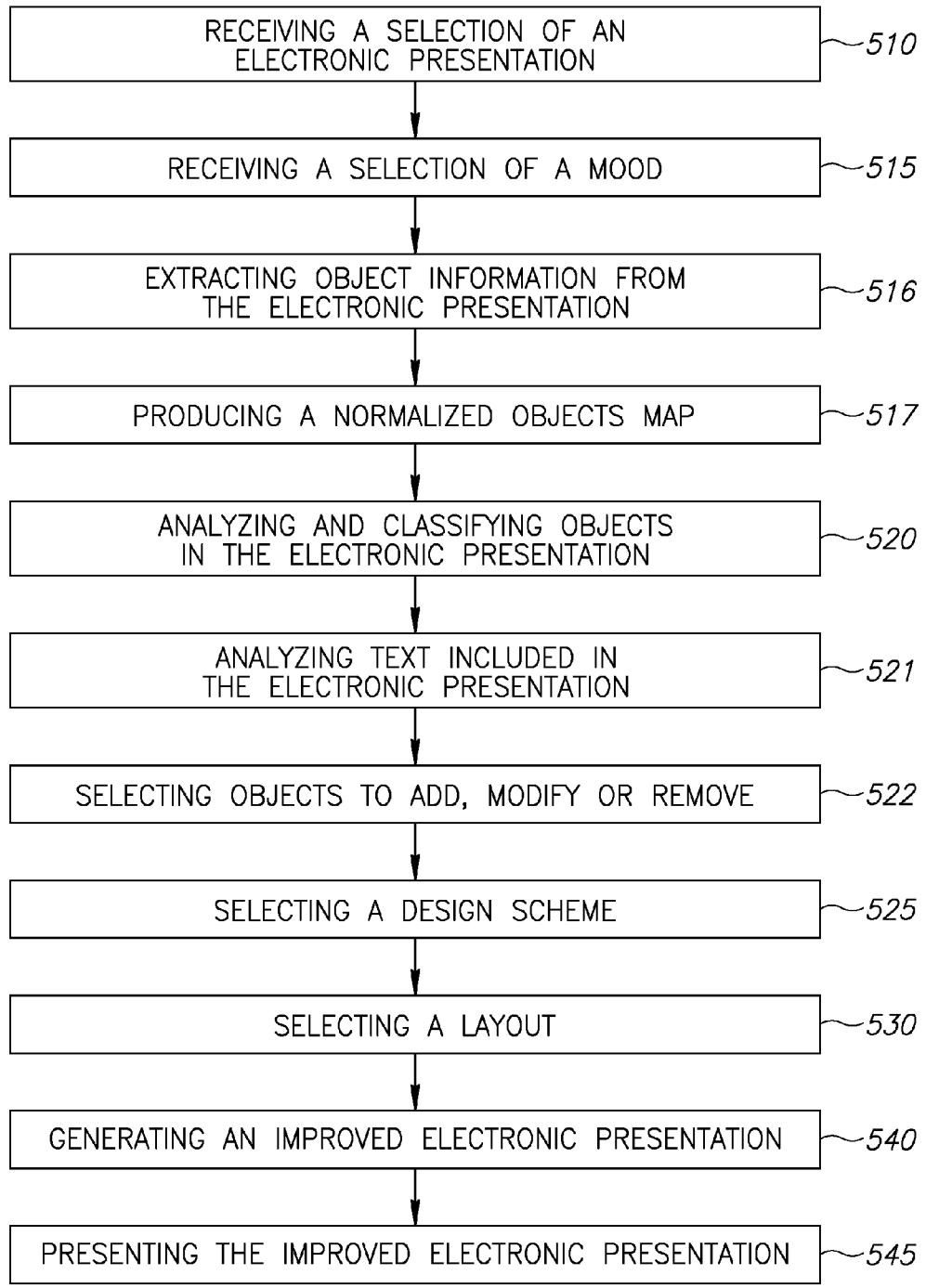
FIG. 5 is a schematic flow chart according to embodiments of the invention.

Reference is made to FIG. 5 showing an exemplary flow chart according to embodiments of the invention. An input presentation that may be modified or used in order to generate an improved or enhanced presentation may be referred to herein as the original or input presentation. An embodiment of the invention performing the automated improvement may be referred to herein as the "system", e.g., system 200. According to embodiments of the invention and as indicated by block 510, the flow may include receiving a selection of an electronic presentation. For example, a plug-in or add-on module installed in an application such as Powerpoint® may receive a pointer or other reference to the presentation currently loaded into Powerpoint®, or another presentation stored on a disk or elsewhere. Using such reference, a module such as client module 211 may access data and information related to the presentation being improved.

As indicated by block 515, the flow may include receiving a selection of a mood. For example, a list of selectable moods may be presented to the user, e.g., by module 211 and/or a pull-down menu. Exemplary moods that may be included in such list may be classic, formal, colorful, Extreme, mellow, conservative, artistic or extravagant. A mood selected may define general design or other principles or aspects that may be used in the presentation improvement process. Accordingly, an improved presentation and/or a design scheme used to produce it, may be based, at least in part on the mood selected. For example, selecting the extravagant mood may result in a selection of flashy or bright fonts and icons colors while selecting the conservative mood may result in a selection of more conservative color selections for the generated presentation. Other aspects, parameters or decisions may be based on the selected mood, for example, a selection of a design scheme described herein may be based on the selected mood. Other selections may be made by a user at this or other points in the flow. For example, a user may choose or instruct the system to keep images in the original presentation, e.g., refrain from replacing images, or the user may instruct the system not to add, or modify images or alternatively, to remove or replace all images in the original presentation etc. Such selections may be guidelines or they may be strict rules or instructions.

As shown by block 516, the flow may include extracting object information from the electronic presentation. For example and as described herein, extractor 320 may identify objects such as titles, text boxes, images or other objects and may further produce a list or map of such objects in the presentation and extract their attributes and/or other related parameters. As shown by block 517, the flow may include producing a normalized objects map. For example, normalizer 330 may use as input an object map or list produced by extractor 320 and may produce a normalized map as described herein based on such object map.

As shown by block 520, the flow may include analyzing and classifying objects in the electronic presentation. For example, objects in an input presentation, e.g., user presentation 310 shown in FIG. 3 may be classified as "slide title", "image", "bulleted text", "background", "diagram", etc. Analysis of a presentation may include identifying, categorizing and analyzing images, textboxes, tables, charts, graphs, drawings, shapes, titles and subtitles or any applicable objects in a presentation. Analysis of a presentation may include statistical analysis. For example, statistical parameters related to object types, content, categories or other parameters or attributes may be performed. Accordingly, various parameters or aspects related to an improved presentation may be selected based on statistical analysis results. For example, if the input presentation includes many pictures then a suitable background may be selected, e.g., one that is suitable for the types or dominant colors in the pictures.

Exemplary categories may be a textual objects category and a graphical objects category. For example, textual objects may be categorized as "slide titles", "bullet text", "text box", "textual footmark" and others. Graphical objects categories may include icons, bitmaps, vector-graphics, drawings, etc. Classification may be used in order to determine further actions such as replacement or removal of images, formatting of text, layout selection etc. An object in a presentation may be a text string or word, a graphical object, e.g., an image, a bullet, a background or any other digital object or entity. Other aspects related to a presentation that may be analyzed may be layout, indentation, alignment, borders etc. During analyzing the original presentation, any information may be extracted from the original presentation, for example as shown by block 516, including information or parameters related to text, graphical objects or any other relevant objects.

Object analysis may include analysis of any object or attribute associated with an object. For example, floating or otherwise moving text or images may be analyzed as such. Any attributes associated with objects such as bullets, backgrounds or images may be determined and reflected in a result of the analysis. Visual effects in a presentation may be identified and taken into account when an improved presentation is generated. Accordingly, generating an improved presentation may be according to analysis of objects and their associated attributes. Analysis of an object may be based on or otherwise related to the content of the object and/or the object's type. For example, object analysis may include any form of image processing as known in the art. For example, a picture, drawing or photo in a presentation may be analyzed. Such analysis may enable determining any applicable parameters or information related to such object. For example, what is drawn in a drawing, who or what is shown in a picture etc. Accordingly, any applicable aspect of an improved presentation may be based on such analysis. For example, a background, a layout, a scheme, font attributes, visual effects or any applicable graphical, visual, audible or other aspects of an improved presentation may be selected based on content of analyzed objects.

Object analysis may include identifying, grouping and or associating objects. For example, a number of text objects may be grouped to a single, also referred to as normalized text object. Objects may be mapped to or otherwise associated with other objects. For example, a number of objects in an input presentation may be associated with a SmartArt object in an output presentation. Analysis may comprise various operations. For example, objects may be deleted, e.g., they may not be present in an output or generated presentation. Objects may be merged, e.g., based on an analysis result indicating common attributes of such merged objects.

According to embodiments of the invention, analyzing a presentation may include analyzing text, images, drawings, bullets icons, bitmaps, vector-graphics, textual, graphical or other objects or aspects. Such analysis may include classifying and/or categorizing objects in the presentation. Objects may be replaced, modified, removed or added based on analysis and categorization. For example, determining an object is an image may enable embodiments of the invention to replace the image with a more suitable one. Likewise, a set of objects identified as bullets which may differ in style or other attributes may be replaced by a set of bullets which share the same style or other attributes.

As shown by block 521, the flow may include analyzing text included in the electronic presentation. Analysis of text may comprise analyzing the textual content and/or determining the meaning of text strings. For example, text analysis may be performed and may include determining the subject of a text string or of the entire presentation and/or object identifying keywords, also referred to herein as object keywords. Text analysis may be performed on all text in the presentation, for example, the title and bulleted or other text fields. Any text-analysis algorithms, techniques, methods or applications may be used by embodiments of the invention, e.g., word stem extractors, specialized dictionaries (hyponyms, synonyms, etc.), statistical classifiers, and/or other techniques known in the art. A subject of a text string or object determined by text analysis may be used as described herein in the production of an improved presentation.

According to embodiments of the invention, one or more text keyword or object keyword list may be computed for, and associated with, each or some of the objects in a presentation, e.g. text strings objects, a line of text, a slide, or with the entire original presentation. For example, part of speech (POS) analysis may be performed on text using a POS tagger as known in the art, such as in the implementation of the Brill tagger algorithm. Accordingly, nouns may be extracted from text strings. Lemmas (base forms) and hypernyms may be extracted using a Lemma dictionary, e.g., WordNet™, such lemmas may be added to the text keyword or object keyword list. In some embodiments, a list of consecutive word combinations (e.g., two words or more) in a text string may be prepared. A dictionary, e.g., WordNet™, may be searched for such word combinations. Lemmas of word combinations found in the dictionary may be added to the keyword list associated with each text string as described herein. For example, the combination of words "high school" may not be identified as two separate words, e.g., "high" and "school", but rather, as the combination of "high school" which has a specific meaning. Other resources may be used, for example, a database may be searched or queried for word combinations, and the text-keyword list may be updated according to results received. Further, methods such as identifying hypenyms and holonyms may be used to identify repeating terms in the text. Any relevant linguistic objects may be identified by a POS tagger or any methods known in the art. Identified objects may be associated with object keywords.

As described herein, object or text keywords may be used to select images or other objects by relating object or text keywords associated with objects in an input presentation to image keywords. As described herein, image keywords may be manually and/or automatically generated and may be associated with images such that a process may identify relevant image keywords and further locate the associated images. Accordingly, in some embodiments, after a text keyword is determined based on text analysis, a repository that stores images and their respective image keywords is searched or queried. For example, a list of image keywords is searched in order to find an image keyword matching the text keyword. When a matching image keyword is found, the associated image is located and may be used in the generation of the improved presentation.

According to some embodiments, one or more text objects may be analyzed and nouns may be identified. Using a list of identified nouns, a hypernym may be identified and may further be added to a text-keyword list that may be associated with each of the text objects. As described herein, a text keyword may be used to search for images by relating the text keyword with an image keyword and selecting images if a match between the text keyword and image keyword is identified.

Keywords associated with text based on text analysis may be used, for example, by relating text keywords described herein with image keywords that may be associated with images in a database. For example, as described herein, an image database may store graphical objects including photographs, icons, backgrounds, borders and others. Such objects may be associated with image-keywords or object-keywords. Images or other objects for insertion into a presentation may be selected by matching or otherwise relating text-keywords associated with text included in the presentation with image-keywords associated with images, e.g., stored in a database.

According to embodiments of the invention, keywords in a keyword list may be associated with a score that may later be used as described herein. For example, scoring may be according to an hierarchical position or a location in the slide, for example a keyword appearing in the title may get a higher score than a keyword appearing in a text-bullet, a subtitle, table etc. Scoring may also be according to the number of occurrences in a slide and/or the entire presentation. A keyword score as described herein may be calculated separately for each text object or string, for a slide and/or for the entire presentation.

Analyzing and classifying objects in the electronic presentation may include determining slides layout. For example, determined layouts may be or may include title and bullet text, title and subtitle text, title and double column text with/without subtitles, textbox collections, image matrices, and the like. Analyzing and classifying objects in the electronic presentation may include computing statistics. For example, text statistics may determine an average, maximum and minimum text strings length, average or other number of text-bullets in a paragraph, number of letters associated with a bullet, sub-bullet levels, etc. Choosing a layout for a slide or presentation may be based, at least in part, on such statistics. For example, a layout that does not accommodate well long text strings, e.g., one in which text is arranged in narrow columns, may not be chosen for a slide containing long sentences or text strings. A different layout may be selected separately for each slide in a presentation. For example, a first layout may be selected for a first slide containing only a title while a second layout may be selected for a second title containing a title and a number of text lines. Other considerations for selecting a layout may be the type, size and other attributes of images selected to be inserted into the slide, the selected mood and scheme etc.

Analyzing and classifying objects in the electronic presentation may include identifying visual groups. For example, a group of objects sharing a visual aspect may be a visual group. For example, a group of bullets in a slide may be a visual group and may accordingly be associated with a visual group that may be named "bullet_visual_group". As described herein, image groups that may be defined in a database may be related to visual groups detected and/or defined in a presentation during a process of populating a presentation with new images. For example, an image group "bullet_image_group" may be defined and associated with a group of images in a database. Accordingly, images associated with such group may be selected, at least as candidates to be inserted into a presentation where a "bullet_visual_group" was identified. Image groups are further described herein.

Analyzing and classifying objects in the electronic presentation may include determining meaning groups and associating such meaning groups with text, slides or the presentation. For example, hypernyms and/or holonyms shared by keywords identified and associated with text objects as described herein may be recorded in or associated with a meaning group. For example, a first second and third text bullets may contain a country name, e.g., Japan, Spain and England. Accordingly, deducing these are names of countries, a meaning group of "Country" may be defined and may contain or be otherwise associated with the relevant or detected country names. One or more meaning groups may be defined for and associated with a slide, a text line or any other text object in a presentation. As described herein, images inserted into the improved presentation may be selected, for example from an image database, according to meaning groups defined and created as described herein.

In some embodiments, selecting images for a generated and/or improved presentation may comprise identifying and/or extracting nouns, associating identified nouns with hypernyms and/or holonyms, selecting one or more meaning groups according to the identified nouns and/or associated hypernyms and/or holonyms and selecting one or more images based on the meaning groups. For example, nouns may be identified by implementing a part of speech (POS) tagging algorithm as known in the art. Hypernyms and/or holonyms may be associated with nouns using any appropriate dictionary, such as WordNet™. A meaning group may be defined such that it includes or is otherwise associated with a plurality of nouns that are associated with one or more common hypernym or holonym. Accordingly, identified nouns may be associated with a meaning group. In some cases, more than one meaning group may be suitable, accordingly, a number of meaning groups may be designated as candidates. In some embodiments, selecting a meaning group from a plurality of candidate meaning groups may be according to the number of nouns in the group that are associated with an image. As described herein, a text keyword associated with text in a presentation may be compared, correlated or otherwise related to an image keyword associated with an image. Accordingly, a meaning group may be selected if all nouns associated with it have a matching image, for example, the associated text keywords associated with all nouns in the meaning group match respective image keywords of obtainable images.

For example, a slide in an input presentation may include three text boxes with the bullets: "The mouse ate cheese", "The dog jumped over the car" and "A cat is a nice animal". The nouns "mouse", "dog" and "cat" may be identified as described herein. A common hypernym that may be associated with these identified nouns may be "animal". A meaning group may be selected based on the nouns and the hypernym. Accordingly, images of a mouse, cat and dog may be selected to be placed near the relevant bullets. Selection according to common parameters such as hypernyms and/or a common meaning group may enable embodiments of the invention to avoid selecting an image of cheese or one of a car in the example above.

As shown by block 522, the flow may include automatically selecting objects to add, modify or remove. Accordingly, the flow may include automatically adding or inserting images or other objects into a presentation and/or removing objects from a presentation. For example, a first image selected from a database may be automatically added or inserted into a presentation and a second image may be automatically removed from the presentation. Accordingly, an improved presentation may include some but not all images or other objects that were included in the original presentation and some objects that were added to the original presentation. Objects such as images may be selected from an image database storing images. For example, file databases 225 or 240 shown in FIG. 1 may store images that may be retrieved by client module 211 and inserted into a presentation.

Images stored in such databases may be private, e.g., containing family pictures. For example, images may be uploaded by a user and may further be only accessible to the user that uploaded them. A user may be required to be authenticated in order to access such private images. Additionally, images may be public, e.g., available to any user employing embodiments of the invention.

Images stored in a database may be associated with a number of parameters, fields, identifiers or metadata. For example, an image or object stored in a database may be associated with an image identification (ID), an orientation parameter, e.g., indicating whether image is facing up, down, left or right, multiple keyword levels, e.g., cellphones, Nokia, 8192, a realism parameter, e.g., indicating whether object is a painting, drawing or photograph, effects parameter, e.g., lighting, 3D/2D, borders, color related parameter such as a colorfulness level, black & white image, color image, dominant color, garishness level etc., a description describing the image, a filename of the file containing the image, a relative path of the file on the relevant storage device, a style of the image, a color type, an image size, an owner, a mood etc. Such metadata may be used, e.g., by module 211, in order to select images for an improved presentation. For example, style and mood parameters associated with an image may be observed, during a selection of images, in order to maintain a consistent and/or desired style and mood of a presentation and possibly to comply with a selected mood and design scheme.

Images or other objects in a database may be associated with image-keywords. Such image-keywords may be similar, comparable and/or relatable to text-keywords associated with text as described above. Accordingly, images may be searched in a database by looking for images associated with image-keywords that match a text-keyword associated with the text for which an image is searched.

In some embodiments, image-keywords may be associated with images by a semi automatic procedure using an image-keyword editor tool. For example, a user may manually associate a keyword with an image, the tool may then examine all keywords associated with the image and suggest, e.g., by a presented list, additional keywords to associate with the image. For example, the tool may interact with a dictionary application such as WordNet™ or a thesaurus application such as Edinburg Word Association Thesaurus™. The tool may determine hypernyms, holonyms, meronyms and/or hyponyms related to keywords already associated with the image and add such or other items automatically or upon receiving user instruction to add specific keywords to the list of keywords associated with the image or object.

According to embodiments of the invention, a score may be associated with keywords. For example, a user may associate a score ranging from one (1) to five (5) to keywords associated with images, for example, by rating (e.g., between one to five)

how well the keyword describes the image. In some embodiments, selecting an image to be included in a presentation may be based on a score associated with a keyword associated with the image. For example, a keyword "pets" may be associated with a line of text in a presentation being improved. An image database may be searched for images associated with the image-keyword "pets". If an image associated with the image-keyword "pets" is detected then if the score associated with the image-keyword is five (5) then the image is selected as a candidate for insertion into the presentation. However, if the score is only three (3) then it may be required that at least two keywords associated with this image will match respective two keywords associated with the relevant text in order for the image to become a candidate for insertion, e.g., next to or below the relevant text. Another example may be locating two images associated with the same keyword but needing only one image to be chosen, a choice in such case may be based on the score associated with the image-keywords that matched the text-keyword used for searching or querying the database.

Image groups defined as described herein may be used for selecting images or other objects to be inserted into a presentation. An image group may define, list or group a number of images that may have distinguishing, common graphic characteristics or attributes. Such images may be visually compatible with each other as well as possibly noticeably different from images excluded from the image group. For example, an image group may contain images of flags of different countries, accordingly, images in the group may have a common attribute not shared by images of other objects which are not country or other flags. Typically, two or more images associated with a common image group may be suitable for being presented in a common slide or region in a presentation. Similarly, an image group may be tagged as exclusive, meaning that images associated with the group are not to be displayed near or with images not in the group. For example, if images from an image group containing images of flags of different countries are selected for a first and second country, it may be inappropriate to select a third image for a third country that is not an image of a flag but rather a symbol of the national sport of such third country. Any rules criteria or conditions for selecting images may be associated with image groups defined and detected as described herein. For example, if a slide contains or is associated with an image-group, an appropriate image may be searched for each member in the meaning-group possibly by matching the image group to image-keywords and taking other parameters such as relevant text-keywords and/or other metadata associated with the images.

As shown by block 525, the flow may include selecting a design scheme. According to embodiments of the invention, a design scheme may define a general "look & feel" of a presentation. In some embodiments, a design scheme may define a general layout and general design rules for the entire presentation as well as specific rules, layout or other aspects for various slide or object types, e.g., title-slides, text-bullet slides and others. For example, a design scheme may define a font attribute, a color palette, a background attribute, an indentation, an alignment, a border parameter, an animation effect, a slide transition effect, a slide object graphic-format related to a presentation, slides or other objects.

A design scheme may define picture types, shape types, object layout styles, for example, as related to SmartArt™ in Powerpoint®. Other aspects that may be defined by a design scheme may be object positioning rules and/or object animations. Selecting a design scheme may be based on a mood selected by the user as described herein. A plurality of design schemes may be stored in a database, e.g., file database 225 in FIG. 2A. Such design schemes may be associated with weights. In cases where according to a selected mood or other parameters, more than one scheme may be selected, a selection may be made based on associated weight, e.g., the design scheme associated with the higher weight may be selected. Alternatively, a design scheme may be selected randomly from a number of suitable schemes. Randomly selecting a scheme may enable embodiments of the invention avoiding repeating the same scheme in cases where diversity is required or desirable. A design scheme may define aspects such as color palettes, fonts, shape effects, slide transition effects or backgrounds. A design scheme may define object types, e.g., picture types, shape types or object layout styles (such as SmartArt™ in Microsoft Powerpoint®). Slide layouts may be defined by a design scheme, for example, object positioning rules, e.g., place objects at center or lower left corner of slides or object animation rules or schemes. Exemplary definitions in a design scheme may be color palettes for textual and graphical objects definitions, layouts for different slide-types, font sizes, decoration shape types, graphical object categories, etc. Accordingly, selecting a design scheme may affect various aspects of the resulting, improved presentation since generating the improved presentation may be based on information, data, parameters, thresholds, criteria or settings defined in a selected design scheme. In cases where several design scheme choices are appropriate for a presentation, selecting a design scheme may be performed in a pseudo-random manner or by observing weights that may be associated with design schemes.

As shown by block 530, the flow may include selecting a layout. For example, a layout for some or all slides in a presentation may be selected. In some embodiments, selection of a layout may be for each slide separately, accordingly, a different layout may be selected for each slide. In other embodiments, any correlation between layouts of slides, and accordingly the selection of such layouts may be possible. A layout may determine parameters, aspects or attributes such as the locations or orientation of objects in a generated slide. A layout may be selected based on attributes or other aspects related to objects included in a slide, including objects selected to be added as described herein. A layout may be selected based on a selected design scheme and/or other parameters. A selected layout may define parameters such location, orientation or arrangement of text and or images in a slide. Selecting a layout may be based, at least in part, on a selected mood. Any other entities or parameters computed or otherwise derived or obtained may be used in the selection of a layout. For example, a user's choice for a layout may be taken into account, image groups detected, text-keywords detected or identified in the presentation, type, number or other parameters related to images selected as described etc. A layout database, e.g., database 225 in FIG. 2A, may be searched for slide layouts appropriate for creating the new slide. A layout may be selected based on parameters such as original-slide objects, text statistics described herein, selected images, a selected design scheme, object analysis information, etc. Layouts in a database may be associated with metadata that may enable matching or otherwise associating a layout with a design scheme or other parameters of a presentation. For example, tags that may be similar in functionality to text and image keywords may be associated with layouts. Accordingly, a layout may be selected by relating a parameter of a design scheme, selected mood or any other applicable parameter to a tag or other metadata of the layout.

According to a selected level or parameter, different layouts may be selected pseudo randomly from a group of layouts that meet predefined criteria as described herein with relation to selecting a layout. Such pseudo random selection may enable embodiments of the invention to avoid repeating the same layout with relation to a number of presentations, e.g., a different layout may be produced each time an improvement process is initiated.

In some embodiments, a layout may be selected by following a design or aesthetic rule tree. Possibly upon determining relevant attributes of a slide as described herein, e.g., text analysis results, type and number of objects etc., a rule tree may be selected. For example, a first rule tree may be related to slides containing a title and bullets, a second rule tree may be related to slides containing bullets and a picture while a third rule tree may be related to a slide containing a title, bullets and a plurality of images. A rule tree may be similar, in some aspects, to a flow chart or diagram. For example, a rule tree may define a plurality of decision junctions where according to criteria, thresholds or other parameters, layout decisions, actions a path in the rule tree and/or other aspects are determined. Accordingly, a rule tree associated with a presentation or a slide type (e.g., a slide containing bullets and a single picture) may be followed in order to define a layout and other aspects related to an improvement of the slide or presentation.

Various criteria, tests, thresholds or other parameters in a rule tree may define various actions. For example, for a slide containing bullets, the rule tree may include determining if "too much text" is included in a slide where "too much text" may be a predefined parameter defining a maximum number of words, sentences or lines of text per slide. If determined that too much text is included in a slide a resulting action, according to a rule tree may be a splitting of the slide into two slides. Similarly, other sections of a rule tree may determine if images are to be added, text is to be enlarged etc. A number of rule trees may be stored in a database and may be retrieved and used when required, e.g., from database 225 by module 211.

As shown by block 540, the flow may include generating an improved electronic presentation. According to embodiments of the invention, generating an improved electronic presentation may include automatically performing any alterations or modifications related to the original presentation or it may comprise of generating an entire new presentation, e.g., leaving the original presentation untouched. For example, editing or authoring related functions may be automatically performed. Textual, graphical or other objects, attributes and/or parameters in the original presentation may be added, removed, replaced or otherwise manipulated. For example, layouts, colors, images, pictures, photographs, fonts, borders, text strings, bullets, icons, photographs, backgrounds, animations, alignments or indentations may be inserted, manipulated, changed, replaced or modified. If the improved presentation is generated without altering the original or input presentation then any operations required may be automatically performed, e.g., a new, empty, presentation file may be created and may be edited to create a new presentation.

According to embodiments of the invention, generating an improved electronic presentation may be based on information obtained by analyzing the original presentation as described herein. For example, according to text analysis, object analysis, selected scheme, layout, rules and criteria defined and determined as described herein. Images may be added according to results of text analysis of text included in the original presentation. Generating an improved electronic presentation may be based on parameters received, obtained, calculated or computed as described herein, for example, parameters derived based on textual or other analysis of the original presentation. Slides layout may be populated with objects according to aesthetic rules that may be obtained from a database, e.g., design-scheme, layouts and design rule databases. Images may be retrieved from an image database according to selection methods described herein and may be used to generate an improved presentation. Attributes of original objects in the original presentation may be manipulated. For example, a picture hue, tone or shade levels may be modified, e.g., in order to assure coherency between pictures in the improved presentation. Other parameters, e.g., resolution of images, borders or size may similarly be modified.

According to embodiments of the invention, generating an improved electronic presentation may include enhancing or improving various aspects of a presentation. For example, readability may be enhanced by selecting visually balanced color combinations for presentation text and background, allowing clear and easy reading of the text. Layout may be improved by ordering objects to be visually comprehensible. Visual consistency may be improved by selecting consistent fonts, icons, color schemes and layouts for all or some of the slides. Compactness, when desired, may be achieved by splitting slides containing more textual content than desirable into several slides, making textual information easier to understand and follow. Visual illustration may be enhanced by transforming numeric tables and/or text-bullets into graphs or diagrams, pictures may be added, possibly emphasizing a subject of a slide or presentation and appearance may be improved by applying aesthetic or other rules and/or criteria, e.g., color combination selections, transforming 2D pictures into 3D ones, adding shadow effects, borders or decorations.

As shown by block 545, the flow may include presenting an improved electronic presentation. According to embodiments of the invention, a number of improved versions may be generated, for example as described with relation to block 540. For example, a user may instruct module 211 to generate three alternative improved presentations, possibly selecting different layouts or other aspects. Another example may be the case when a number of layouts or scheme match a selected mood or are determined to be similarly suitable. Accordingly, presenting an improved presentation may include presenting any number of alternative presentations. A user may save or discard any presented presentation. Presenting an improved presentation may include loading the improved presentation into an application such as Powerpoint® and utilizing a display screen, speakers or other devices that may be connected to a relevant computing device as described herein.

Reference is made to FIG. 6, showing a high level block diagram of an exemplary computing device according to embodiments of the present invention. Computing device 600 may include a controller 605 that may be, for example, a central processing unit processor (CPU), a chip or any suitable computing or computational device, an operating system 615, a memory 620, a storage 630, an input device 635 and an output device 640.

Operating system may be or may include any code segment designed and/or configured to perform tasks involving coordination, scheduling, arbitration, supervising, controlling or otherwise managing operation of computing device 600, for example, scheduling execution of programs. Operating system 615 may be a commercial operating system. Memory 620 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 620 may be or may include a plurality of, possibly different memory units.

Executable code 625 may be any executable code, e.g., an application, a program, a process, task or script. Executable code 625 may be executed by controller 605 possibly under control of operating system 615. Storage 630 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data 626 may be any applicable data that may be loaded into memory 620. For example, data 626 may be images, layout information or design related information that may be used by module 211 for generating an improved presentation as described herein.

Input devices 635 may be or may include a mouse, a keyboard, a touch screen or pad or any suitable input device. It will be recognized that any suitable number of input devices may be operatively connected to computing device 600 as shown by block 635. Output devices 640 may include one or more displays, speakers and/or any other suitable output devices. It will be recognized that any suitable number of output devices may be operatively connected to computing device 600 as shown by block 640. Any applicable input/output (I/O) devices may be connected to computing device 600 as shown by blocks 635 and 640. For example, a network interface card (NIC), a printer or facsimile machine, a universal serial bus (USB) device or external hard drive may be included in input devices 635 and/or output devices 640.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein. For example, a storage medium such as memory 620, computer-executable instructions such as executable code 625 and a controller such as controller 605. Some embodiments may be provided in a computer program product that may include a machine-readable medium, stored thereon instructions, which may be used to program a computer, or other programmable devices, to perform methods as disclosed above.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method for automatic generation of an improved electronic presentation using improvement of an input electronic presentation, the method comprising:
   associating a plurality of images with a respective plurality of image keywords and with a respective plurality of scores;
   analyzing the input electronic presentation;
   associating, based on said analyzing, an object in said input electronic presentation with an object keyword;
   designating at least two images included in said plurality of images as candidates for an insertion into the improved electronic presentation by relating said object keyword to said plurality of image keywords;
   selecting from the at least two images an image to be inserted into the improved electronic presentation based on relating a first and a second score respectively associated with a first and a second image included in the at least two images;
   automatically modifying based on a result of said analysis at least one graphical object included in the input electronic presentation to produce a modified object;
   and generating the improved electronic presentation using said modified object and using an image selected for insertion, wherein said input electronic presentation and said improved electronic presentation are in the same proprietary electronic presentation format.

2. The method of claim 1, comprising:
   performing text analysis of text included in said input electronic presentation;
   selecting, based on said text analysis, at least one image; and
   including said at least one image in said improved electronic presentation.

3. The method of claim 2, comprising:
   selecting, based on said text analysis, a layout for at least one slide; and
   generating said improved electronic presentation according to said layout.

4. The method of claim 1, comprising:
   analyzing at least one object included in said input electronic presentation;
   selecting, based on said analyzing at least one object, a layout for at least one slide; and
   generating said improved electronic presentation according to said layout.

5. The method of claim 4, wherein said at least one object is one of: an image, a textbox, a table, a chart, a graph, a drawing, a shape, a title and subtitle.

6. The method of claim 4, comprising analyzing said at least one object based on a type and a content of said at least one object.

7. The method of claim 4, wherein analyzing said at least one object comprises determining at least one of: a location, a size, a type and an orientation of said at least one object.

8. The method of claim 1, comprising:
   receiving a mood selection from a user;
   selecting a design scheme based on said mood and generating said improved electronic presentation according to said design scheme.

9. The method of claim 8, wherein said scheme defines at least one of: a font attribute, a color palette, a background attribute, an indentation, an alignment, a border, an animation effect, a slide transition effect, a slide object graphic-format.

10. The method of claim 1, comprising analyzing said input electronic presentation and producing an improved electronic presentation by automatically modifying said input electronic presentation based on a result of said analysis.

11. The method of claim 1, comprising rearranging and reformatting objects in said input electronic presentation to produce the improved electronic presentation.

12. The method of claim 1, comprising generating said improved electronic presentation based on at least one predefined aesthetic rule.

13. The method of claim 1, comprising generating said improved electronic presentation based on at least one predefined design rule.

14. An article comprising a non-transitory computer-readable storage medium, having stored thereon instructions, that when executed on a computer, cause the computer to:
   associating a plurality of images with a respective plurality of image keywords and with a respective plurality of scores;

receive an input electronic presentation; analyze said input electronic presentation; associate, based on the analyzing, an object in said input electronic presentation with an object keyword;

designate at least two images included in said plurality of images as candidates for an insertion into an improved electronic presentation by relating said object keyword to said plurality of image keywords;

select from the at least two images an image to be inserted into the improved electronic presentation based on relating a first and a second score respectively associated with a first and a second image included in the at least two images;

automatically modify based on a result of said analysis at least one graphical object included in the input electronic presentation to produce a modified object;

and generate an improved electronic presentation using said modified object and using an image selected for insertion, wherein said input electronic presentation and said improved electronic presentation are in the same proprietary electronic presentation format.

15. The article of claim 14, wherein the instructions when executed further cause the computer to:
perform text analysis of text included in said input electronic presentation;
select, based on said text analysis, at least one image; and
include said at least one image in said improved electronic presentation.

16. The article of claim 15, wherein the instructions when executed further cause the computer to:
select, based on said text analysis, a layout for at least one slide; and
generate said improved electronic presentation according to said layout.

17. The article of claim 14, wherein the instructions when executed further cause the computer to:
analyze at least one object included in said input electronic presentation;
select, based on said analyzing at least one object, a layout for at least one slide; and
generate said improved electronic presentation according to said layout.

18. The article of claim 17, wherein said at least one object is one of: an image, a textbox, a table, a chart, a graph, a drawing, a shape, a title and subtitle.

19. The article of claim 17, wherein the instructions when executed further cause the computer to analyze said at least one object based on a type and a content of said at least one object.

20. The article of claim 17, wherein the instructions when executed further cause the computer to determine at least one of: a location, a size, a type and an orientation of said at least one object.

21. The article of claim 14, wherein the instructions when executed further cause the computer to:
receive a mood selection from a user;
select a design scheme based on said mood and generate said improved electronic presentation according to said design scheme.

22. The article of claim 21, wherein said scheme defines at least one of: a font attribute, a color palette, a background attribute, an indentation, an alignment, a border, an animation effect, a slide transition effect, a slide object graphic-format.

23. The article of claim 14, wherein the instructions when executed further cause the computer to analyze said input electronic presentation and produce an improved electronic presentation by automatically modifying said input electronic presentation based on a result of said analysis.

24. The article of claim 23, wherein the instructions when executed further cause the computer to rearrange and reformat objects in said input electronic presentation to produce the improved electronic presentation.

25. The article of claim 14, wherein the instructions when executed further cause the computer to generate said improved electronic presentation based on at least one predefined aesthetic rule.

26. The article of claim 14, wherein the instructions when executed further cause the computer to generate said improved electronic presentation based on at least one predefined design rule.

27. The method of claim 1, further comprising receiving said input electronic presentation by a module installed in an electronic presentation authoring application.

28. The method of claim 1, wherein analyzing said input electronic presentation comprises obtaining keywords associated with the input electronic presentation and using the keywords to select an object to be used in generating the improved electronic presentation.

29. The article of claim 14, wherein the instructions stored on said non-transitory computer-readable storage medium are a module installed in an electronic presentation authoring application.

30. The article of claim 14, wherein said instructions, when executed on a computer, cause the computer to:
analyze said input electronic presentation to determine at least one keyword associated with the input electronic presentation, and
use the at least one keyword to automatically select at least one graphical object to be used in generating the improved electronic presentation.

* * * * *